United States Patent Office

2,927,140
Patented Mar. 1, 1960

2,927,140

PROCESS FOR CATALYTICALLY HYDROGENATING BENZENE

Sjoerd Kaarsemaker, Sittard, and Jan A. Meys, Geleen, Netherlands, assignors to Stamicarbon N.V.

No Drawing. Application September 8, 1958
Serial No. 759,431

Claims priority, application Netherlands
September 16, 1957

9 Claims. (Cl. 260—667)

The present invention relates to the catalytic hydrogenation of benzene to cyclohexane.

It is known that benzene may be hydrogenated either in the gaseous or liquid phase using a suitable hydrogenation catalyst, typically a nickel catalyst, to form cyclohexane. The catalyst used in such hydrogenation may take a variety of forms. For example, the catalyst may be a foraminate catalyst fixed within the reaction chamber. Alternatively, the catalyst may be used in powder form, such as Raney nickel or on a suitable carrier, typically diatomaceous earth or silica. If a powdered catalyst is used and the process is carried out in the liquid phase, it is also possible to convey the catalyst through the reaction space, e.g. through series-connected reactors, in the form of a suspension.

In any event, regardless of the form of the catalyst, it is essential that the heat of reaction be removed because the catalyst rapidly loses its activity if heat removal is inadequate.

The principal object of the present invention is to provide an improved process for catalytically hydrogenating benzene to cyclohexane. Another object of the invention is the provision of a process whereby the heat of reaction is effectively and simply removed. Other objects will also be apparent.

The abovementioned objects are accomplished, according to the present invention, by carrying out the catalytic hydrogenation of benzene, in the presence of cyclohexanol. In addition to effecting a highly desirable yield of cyclohexane, it has been discovered that the catalytic hydrogenation of benzene in the presence of cyclohexanol, as described herein, brings about a simultaneous purification of cyclohexanol from any impurities therein. Furthermore, as indicated heretofore, removal of the heat of reaction is readily accomplished by maintaining the catalyst in contact with liquid cyclohexanol during the hydrogenation.

The present process is desirably carried out at a temperature between 150 and 250° C. Within this temperature range, it has been found that the benzene is hydrogenated substantially quantitatively to cyclohexane. At lower temperatures, i.e. below 150° C., the hydrogenation is slow. Hence, these lower temperatures are not attractive. Higher temperatures over 250° C., are also preferably avoided due to the danger of dissociation and formation of undesirable byproducts.

The instant process may be carried out either in the liquid phase or gaseous phase. The pressure utilized may be varied and depends upon the particular phase desired. In any event, it is a specific advantage of the invention that relatively low pressures may be used even for liquid phase operations since high pressures are not necessary to keep the benzene and/or cyclohexane, in the liquid state. Thus, for example, the present process may be operated at pressures below 100 atmospheres, preference being given to a pressure between 20–50 atmospheres, e.g. 20, 30 or 50 atmospheres for liquid phase operations. Operations in the gaseous phase may take place at atmospheric pressure or above, e.g. 2–10 atmospheres.

The hydrogenating gas may be pure hydrogen or, if desired, mixtures of hydrogen with inert gases, such as nitrogen, may be used. Sufficient hydrogen should be used to effect complete hydrogenation of benzene. Usually, excess hydrogen amounting to 3.5 to 5 mols per mol of benzene is utilized.

As indicated heretofore, the process of the invention offers the advantage that impure cyclohexanol can be used in the hydrogenation of benzene, cyclohexane and pure cyclohexanol being recovered from the reaction products. A separate purification of the cyclohexanol is thus rendered superfluous. This is of special importance in connection with processes wherein cyclohexanol is used as a starting material, for instance in the preparation of cyclohexanone, in which even small amounts of impurities in the cyclohexanol have a marked adverse influence on the dehydrogenation. Typically, cyclohexanol which has been prepared by the oxidation of cyclohexane, e.g. with air, requires further processing to remove impurities therein before it can be used in the preparation of cyclohexaanone. The present process provides a very simple way of accomplishing the purification so that cyclohexanol used therein may be subsequently utilized without further purification in the preparation of cyclohexanone.

The amount of cyclohexanol used, according to the invention, may be varied considerably. Preferably, however, an amount between 0.1–1 mol of cyclohexanol per mol of benzene is used. With such an amount of cyclohexanol, no difficulties are experienced in working with the catalyst in any form, e.g. as a solid foraminate catalyst or Raney nickel. In the case of Raney metal, the catalyst may be suspended in cyclohexanol and passed continuously through the reaction space. The usual amount of catalyst, 0.1–10% by weight with respect to the benzene, may be employed. Less than 0.1 mol of cyclohexanol per mol of benzene preferably should not be used when operating in the liquid phase.

The cyclohexanol may be added to the hydrogenation zone in various ways. Typically, the benzene and the cyclohexanol may be fed into the hydrogenation vessel separately or jointly, either in the vapor or in the liquid phase. When using a powdered catalyst which is continuously passed through the hydrogenation vessel, the catalyst may be fed into the vessel suspended in benzene or in cyclohexanol, or in a mixture of benzene and cyclohexanol.

After the hydrogenation is completed, vapors present in the reaction zone should be condensed after which the liquid products may be separated into fractions in conventional fashion, e.g. by distillation. Distillation or like separation gives a reaction product comprising cyclohexane and pure cyclohexanol.

The invention will be more fully understood by reference to the following examples which are given for purposes of illustration only:

Example 1

The hydrogenation of benzene is carried out in a reaction vessel consisting of vertical tubes connected in series. The tubes were fitted with a jacket for temperature control, by means of which the temperature in the tubes was maintained at 180° C. The pressure was maintained at 30–35 atmospheres.

Benzene was fed into the reaction compartment at the rate of 30 kg. per hour, cyclohexanol at the rate of 20 kg. per hour and Raney nickel catalyst, suspended in the cyclohexanol, at the rate of 1 kg. per hour. In addition, a hydrogenation gas consisting of 85% by vol. of hydrogen and 15% by vol. of nitrogen was fed into the reactor in an amount of 3.65 mols of hydrogen per mol of benzene. The settling of the catalyst suspension was prevented by recycling part of the gases to the reaction compartment.

The cyclohexanol used was obtained by oxidation of cyclohexane with air and separation of the crude cyclohexanol from the oxidation product which contained cyclohexanol and cyclohexanone. This cyclohexanol contained about 1% of impurities difficult to remove by distillation, which hinder the dehydrogenation of cyclohexanol to cyclohexanone.

The reaction product issuing from the reaction compartment was cooled and the liquid product filtered and then led into a distillation plant where cyclohexane and cyclohexanol were separated off. Per hour, about the theoretical amount, 32 kg. of cyclohexane and 20 kg. of pure cyclohexanol, was obtained. No difficulties were experienced in processing the cyclohexanol thus obtained to cyclohexanone.

*Example II*

Using hydrogenation apparatus as described in Example I, benzene was hydrogenated under identical conditions except that the temperature was 185° C., and benzene was fed into the reaction compartment at the rate of 40 kg. per hour, with impure cyclohexanol at the rate of 10 kg. per hour (same origin as the cyclohexanol used in Example I). The cyclohexanol contained 1 kg. of Raney nickel.

Per hour 42 kg. of cyclohexane and 10 kg. of pure cyclohexanol were removed from the reaction products.

It will be appreciated that various modifications may be made in the invention described herein without deviating from the scope thereof. Thus, while the foregoing examples illustrate the use of Raney nickel as catalyst, other conventional hydrogenation catalysts for converting benzene to cyclohexane may be utilized, typically, nickel on diatomaceous earth.

Accordingly, the scope of the invention is defined in the following claims wherein we claim:

1. In a process for catalytically hydrogenating benzene to produce cyclohexane, the improvement which comprises carrying out said hydrogenation in the presence of cyclohexanol.

2. The process of claim 1 wherein the hydrogenation catalyst is maintained in contact with liquid cyclohexanol.

3. The process of claim 1 wherein the catalyst is a nickel catalyst suspended in cyclohexanol.

4. The proces sof claim 1 wherein the hydrogenation is carried out at a temperature between 150 and 250° C.

5. The process of claim 1 wherein the hydrogenation is carried out at a pressure below 100 atmospheres.

6. The process of claim 1 wherein the hydrogenation is carried out in the liquid phase.

7. The process of claim 1 wherein the hydrogenation is carried out in the gaseous phase.

8. The process of claim 1 wherein the amount of cyclohexanol is between 0.1 to 1 mol per mol of benzene.

9. A process for hydrogenating benzene to produce cyclohexane which comprises reacting benzene with hydrogen gas in the presence of a suspension of Raney nickel catalyst in cyclohexanol at a temperature between 150 to 250° C., and a pressure below 100 atmospheres, the amount of cyclohexanol being between 0.1 to 1 mol per mol of benzene, and the amount of catalyst being between 0.1 to 10% by weight of the benzene, continuing said reaction until hydrogenation of the benzene is substantially complete and then recovering cyclohexane and pure cyclohexanol from the resulting reaction mixture.

References Cited in the file of this patent

UNITED STATES PATENTS

| | | |
|---|---|---|
| 2,473,997 | Hansley | June 21, 1949 |
| 2,734,921 | Bewley et al. | Feb. 14, 1956 |
| 2,755,317 | Kassel | July 17, 1956 |